United States Patent
Kim et al.

(10) Patent No.: US 11,044,060 B2
(45) Date of Patent: Jun. 22, 2021

(54) METHOD FOR TRANSMITTING/RECEIVING REFERENCE SIGNAL IN NEXT GENERATION COMMUNICATION SYSTEM, AND DEVICE THEREFOR

(71) Applicant: LG ELECTRONICS INC., Seoul (KR)

(72) Inventors: Hyungtae Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 16/088,043

(22) PCT Filed: Mar. 20, 2017

(86) PCT No.: PCT/KR2017/002941
§ 371 (c)(1),
(2) Date: Sep. 24, 2018

(87) PCT Pub. No.: WO2017/164590
PCT Pub. Date: Sep. 28, 2017

(65) Prior Publication Data
US 2020/0304257 A1    Sep. 24, 2020

Related U.S. Application Data

(60) Provisional application No. 62/313,104, filed on Mar. 24, 2016.

(51) Int. Cl.
*H04L 5/00* (2006.01)
*H04W 24/10* (2009.01)
*H04W 72/04* (2009.01)

(52) U.S. Cl.
CPC .......... *H04L 5/0048* (2013.01); *H04L 5/0053* (2013.01); *H04W 24/10* (2013.01); *H04W 72/048* (2013.01)

(58) Field of Classification Search
CPC ....... H04L 5/0048; H04L 5/0053; H04L 5/00; H04W 24/10; H04W 72/048; H04W 72/04

See application file for complete search history.

(56) References Cited

U.S. PATENT DOCUMENTS

2014/0086084 A1     3/2014  Bi et al.
2014/0092878 A1*    4/2014  Davydov .............. H04W 28/16
                                                370/336

(Continued)

FOREIGN PATENT DOCUMENTS

KR       1020030075883        9/2003
WO         2013005986         1/2013
WO      WO-2017049599 A1 *    3/2017  ........... H04B 7/0695

OTHER PUBLICATIONS

PCT International Application No. PCT/KR2017/002941, Written Opinion of the International Searching Authority dated Jun. 28, 2017, 18 pages.

(Continued)

*Primary Examiner* — Saumit Shah
(74) *Attorney, Agent, or Firm* — Lee Hong Degerman Kang Waimey

(57) ABSTRACT

Disclosed in the present application is a method by which a terminal transmits channel state information to a network in a wireless communication system. Particularly, the method comprises the steps of: receiving, from the network, information on a specific channel measurement resource and a specific interference measurement resource; calculating the channel state information by using the specific channel measurement resource and the specific interference measurement resource; and transmitting, to the network, the calculated channel state information, wherein independent (Continued)

beamforming is applied in units of symbols to the specific channel measurement resource.

10 Claims, 19 Drawing Sheets

(56) References Cited

U.S. PATENT DOCUMENTS

2014/0204848 A1    7/2014  Geirhofer et al.
2015/0249526 A1*  9/2015  Kim .................... H04L 5/0051
                                                          370/329

OTHER PUBLICATIONS

Samsung, "Updates on A-CSI Reporting", 3GPP TSG RAN WG1 Meeting #84, R1-160543, Feb. 2016, 3 pages.

* cited by examiner (A) CONTROL-PLANE PROTOCOL STACK (B) USER-PLANE PROTOCOL STACK FIG. 9
| | SC0 | 1 | 2 | 3 | 4 | 5 | 6 | 7 | 8 | 9 | 10 | 11 |
|---|---|---|---|---|---|---|---|---|---|---|---|---|
| OS0 | | | | | | | | | | | | |
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| 9 | | | | | | | | | | | | |
| 10 | | | | | | | | | | | | |
| 11 | | | | | | | | | | | | |
| 12 | | | | | | | | | | | | |
| 13 | | | | | | | | | | | | |
FIG. 10
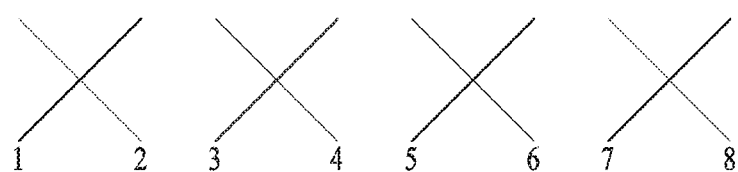
(a)
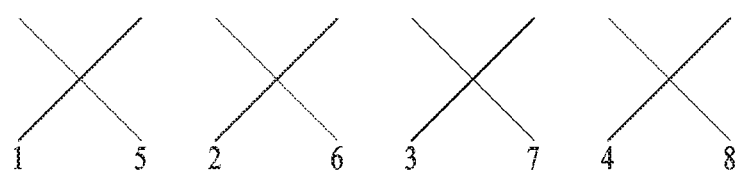
(b)

FIG. 11

| | SC0 | 1 | 2 | 3 | 4 | 5 | 6 | 7 | 8 | 9 | 10 | 11 |
|---|---|---|---|---|---|---|---|---|---|---|---|---|
| OS x | 0,1 | 4,5 | 0,1 | 4,5 | 0,1 | 4,5 | 2,3 | 6,7 | 2,3 | 6,7 | 2,3 | 6,7 |
| OS y | 0,1 | 4,5 | 0,1 | 4,5 | 0,1 | 4,5 | 2,3 | 6,7 | 2,3 | 6,7 | 2,3 | 6,7 |
| (e.g. x,y=12,13) | | | | | | | | | | | | |

FIG. 12

| 16pt | SC0 | 1 | 2 | 3 | 4 | 5 | 6 | 7 | 8 | 9 | 10 | 11 |
|---|---|---|---|---|---|---|---|---|---|---|---|---|
| OS x | 0,1 | 0,1 | 4,5 | 4,5 | | | 2,3 | 2,3 | 6,7 | 6,7 | | |
| OS y | 8,9 | 8,9 | 12,13 | 12,13 | | | 10,11 | 10,11 | 14,15 | 14,15 | | |

| 8pt | SC0 | 1 | 2 | 3 | 4 | 5 | 6 | 7 | 8 | 9 | 10 | 11 |
|---|---|---|---|---|---|---|---|---|---|---|---|---|
| OS x | 0,1 | 0,1 | 4,5 | 4,5 | | | 2,3 | 2,3 | 6,7 | 6,7 | | |
| OS y | 0,1 | 0,1 | 4,5 | 4,5 | | | 2,3 | 2,3 | 6,7 | 6,7 | | |

| 4pt | SC0 | 1 | 2 | 3 | 4 | 5 | 6 | 7 | 8 | 9 | 10 | 11 |
|---|---|---|---|---|---|---|---|---|---|---|---|---|
| OS x | 0,1 | 0,1 | 0,1 | 0,1 | 0,1 | 0,1 | 2,3 | 2,3 | 2,3 | 2,3 | 2,3 | 2,3 |
| OS y | 0,1 | 0,1 | 0,1 | 0,1 | 0,1 | 0,1 | 2,3 | 2,3 | 2,3 | 2,3 | 2,3 | 2,3 |

| 1 or 2 pt | SC0 | 1 | 2 | 3 | 4 | 5 | 6 | 7 | 8 | 9 | 10 | 11 |
|---|---|---|---|---|---|---|---|---|---|---|---|---|
| OS x | 0,1 | 0,1 | 0,1 | 0,1 | 0,1 | 0,1 | 0,1 | 0,1 | 0,1 | 0,1 | 0,1 | 0,1 |
| OS y | 0,1 | 0,1 | 0,1 | 0,1 | 0,1 | 0,1 | 0,1 | 0,1 | 0,1 | 0,1 | 0,1 | 0,1 |

FIG. 13

| 16pt | SC0 | 1 | 2 | 3 | 4 | 5 | 6 | 7 | 8 | 9 | 10 | 11 |
|---|---|---|---|---|---|---|---|---|---|---|---|---|
| OS x | 0,1 | 0,1 | 0,1 | 4,5 | 4,5 | 4,5 | 2,3 | 2,3 | 2,3 | 6,7 | 6,7 | 6,7 |
| OS y | 8,9 | 8,9 | 8,9 | 12,13 | 12,13 | 12,13 | 10,11 | 10,11 | 10,11 | 14,15 | 14,15 | 14,15 |

| 8pt | SC0 | 1 | 2 | 3 | 4 | 5 | 6 | 7 | 8 | 9 | 10 | 11 |
|---|---|---|---|---|---|---|---|---|---|---|---|---|
| OS x | 0,1 | 0,1 | 0,1 | 4,5 | 4,5 | 4,5 | 2,3 | 2,3 | 2,3 | 6,7 | 6,7 | 6,7 |
| OS y | 0,1 | 0,1 | 0,1 | 4,5 | 4,5 | 4,5 | 2,3 | 2,3 | 2,3 | 6,7 | 6,7 | 6,7 |

| 4pt | SC0 | 1 | 2 | 3 | 4 | 5 | 6 | 7 | 8 | 9 | 10 | 11 |
|---|---|---|---|---|---|---|---|---|---|---|---|---|
| OS x | 0,1 | 0,1 | 0,1 | 0,1 | 0,1 | 0,1 | 2,3 | 2,3 | 2,3 | 2,3 | 2,3 | 2,3 |
| OS y | 0,1 | 0,1 | 0,1 | 0,1 | 0,1 | 0,1 | 2,3 | 2,3 | 2,3 | 2,3 | 2,3 | 2,3 |

| 1 or 2 pt | SC0 | 1 | 2 | 3 | 4 | 5 | 6 | 7 | 8 | 9 | 10 | 11 |
|---|---|---|---|---|---|---|---|---|---|---|---|---|
| OS x | 0,1 | 0,1 | 0,1 | 0,1 | 0,1 | 0,1 | 0,1 | 0,1 | 0,1 | 0,1 | 0,1 | 0,1 |
| OS y | 0,1 | 0,1 | 0,1 | 0,1 | 0,1 | 0,1 | 0,1 | 0,1 | 0,1 | 0,1 | 0,1 | 0,1 |

FIG. 14

| 16pt | SC0 | 1 | 2 | 3 | 4 | 5 | 6 | 7 | 8 | 9 | 10 | 11 |
|---|---|---|---|---|---|---|---|---|---|---|---|---|
| OS x | 0 | 1 | 4 | 5 | | | 2 | 3 | 6 | 7 | | |
| OS y | 8 | 9 | 12 | 13 | | | 10 | 11 | 14 | 15 | | |

| 8pt | SC0 | 1 | 2 | 3 | 4 | 5 | 6 | 7 | 8 | 9 | 10 | 11 |
|---|---|---|---|---|---|---|---|---|---|---|---|---|
| OS x | 0 | 1 | 4 | 5 | | | 2 | 3 | 6 | 7 | | |
| OS y | 0 | 1 | 4 | 5 | | | 2 | 3 | 6 | 7 | | |

| 4pt | SC0 | 1 | 2 | 3 | 4 | 5 | 6 | 7 | 8 | 9 | 10 | 11 |
|---|---|---|---|---|---|---|---|---|---|---|---|---|
| OS x | 0 | 1 | 0 | 1 | 0 | 1 | 2 | 3 | 2 | 3 | 2 | 3 |
| OS y | 0 | 1 | 0 | 1 | 0 | 1 | 2 | 3 | 2 | 3 | 2 | 3 |

| 1 or 2 pt | SC0 | 1 | 2 | 3 | 4 | 5 | 6 | 7 | 8 | 9 | 10 | 11 |
|---|---|---|---|---|---|---|---|---|---|---|---|---|
| OS x | 0 | 1 | 0 | 1 | 0 | 1 | 0 | 1 | 0 | 1 | 0 | 1 |
| OS y | 0 | 1 | 0 | 1 | 0 | 1 | 0 | 1 | 0 | 1 | 0 | 1 |

FIG. 17

| 8pt | SC0 | 1 | 2 | 3 | 4 | 5 | 6 | 7 | 8 | 9 | 10 | 11 | SC0 | 1 | 2 | 3 | 4 | 5 | 6 | 7 | 8 | 9 | 10 | 11 |
|---|---|---|---|---|---|---|---|---|---|---|---|---|---|---|---|---|---|---|---|---|---|---|---|---|
| OS x | 0,1 | 0,1 | 4,5 | 4,5 | 2,3 | 2,3 | 6,7 | 6,7 | 0,1 | 0,1 | 4,5 | 4,5 | 2,3 | 2,3 | 6,7 | 6,7 | 0,1 | 0,1 | 4,5 | 4,5 | 2,3 | 2,3 | 6,7 | 6,7 |
| OS y | 0,1 | 0,1 | 4,5 | 4,5 | 2,3 | 2,3 | 6,7 | 6,7 | 0,1 | 0,1 | 4,5 | 4,5 | 2,3 | 2,3 | 6,7 | 6,7 | 0,1 | 0,1 | 4,5 | 4,5 | 2,3 | 2,3 | 6,7 | 6,7 | i-th RB | (i+1)-th RB

FIG. 18

|      | SC0 | 1 | 2 | 3 | 4 | 5 | 6 | 7 | 8 | 9 | 10 | 11 |
|------|-----|---|---|---|---|---|---|---|---|---|----|----|
| OS z | 0   | 1 | 2 | 0 | 1 | 2 | 0 | 1 | 2 | 0 | 1  | 2  |
| OS w | 3   | 4 | 5 | 3 | 4 | 5 | 3 | 4 | 5 | 3 | 4  | 5  |

FIG. 19

|      | SC0 | 1 | 2 | 3 | 4 | 5 | 6 | 7 | 8 | 9 | 10 | 11 |
|------|-----|---|---|---|---|---|---|---|---|---|----|----|
| OS z | 0   | 1 | 2 | 3 | 4 | 5 | 0 | 1 | 2 | 3 | 4  | 5  |
| OS w | 0   | 1 | 2 | 3 | 4 | 5 | 0 | 1 | 2 | 3 | 4  | 5  |

FIG. 20

|      | SC0 | 1  | 2 | 3 | 4  | 5  | 6  | 7  | 8 | 9 | 10 | 11 |
|------|-----|----|---|---|----|----|----|----|---|---|----|----|
| OS 6 | 0   | 6  | 2 | 8 | 6  | 11 | 7  | 4  | 5 | 5 | 0  | 7  |
| OS 7 | 9   | 8  | 3 | 2 | 11 | 4  | 1  | 10 | 9 | 1 | 8  | 3  |
| OS 8 | 4   | 11 | 5 | 0 | 3  | 11 | 9  | 7  | 0 | 5 | 2  | 9  |
| OS 9 | 1   | 3  | 7 | 8 | 10 | 6  | 10 | 2  | 4 | 1 | 10 | 6  |

METHOD FOR TRANSMITTING/RECEIVING REFERENCE SIGNAL IN NEXT GENERATION COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/002941, filed on Mar. 20, 2017, which claims the benefit of U.S. Provisional Application No. 62/313,104, filed on Mar. 24, 2016, the contents of which are all hereby incorporated by reference herein in their entirety.

TECHNICAL FIELD

The present invention relates to a wireless communication system, and more particularly, to a method of transmitting/receiving a reference signal in a next generation communication system and apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, the technical task of the present invention is to propose a method of transmitting/receiving a reference signal in a next generation communication system and apparatus therefor.

Technical Solutions

In one technical aspect of the present invention, provided herein is a method of transmitting channel state information to a network by a user equipment in a wireless communication system, the method including receiving information on a specific channel measurement resource and a specific interference measurement resource from the network, computing the channel state information using the specific channel measurement resource and the specific interference measurement resource, and transmitting the computed channel state information to the network, wherein an independent beamforming in symbol unit is applied to the specific channel measurement resource.

In another technical aspect of the present invention, provided herein is a user equipment in a wireless communication system, the user equipment including a wireless communication module and a processor connected to the wireless communication module, the processor configured to compute channel state information using a specific channel measurement resource and a specific interference measurement resource received from a network and transmit the computed channel state information to the network, wherein an independent beamforming in symbol unit is applied to the specific channel measurement resource.

Preferably, the user equipment may report capability of the user equipment to the network and the specific channel measurement resource and the specific interference measurement resource may be determined based on the reported capability of the user equipment.

Preferably, the user equipment may receive information on at least two sets configured with a channel measurement resource and an interference measurement resource from the network and the information on the specific channel measurement resource and the specific interference measurement resource may indicate one of the at least two sets.

More preferably, the at least two sets may include a first set configured with a channel measurement resource located at last two symbols and an interference measurement resource located at a symbol right before the last two symbols in a resource grid defined with a plurality of symbols and a plurality of subcarriers and a second set configured with a channel measurement resource located at a second symbol in the resource grid and an interference measurement resource located at a fourth symbol in the resource grid.

Additionally, a downlink control signal may be located at a first symbol in the resource grid and one of a downlink demodulation reference signal, a downlink data signal and a guard period for changing into an uplink transmission mode may be located at a third symbol in the resource grid.

In some implementations, a sequence assigned to the specific channel measurement resource may be spread by having an orthogonal cover code of length 3 applied thereto.

Advantageous Effects

According to an embodiment of the present invention, a reference signal can be transmitted/received more efficiently in a next generation communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 9 exemplarily shows a NewRAT corresponding subframe structure according to an embodiment of the present invention.

FIG. 10 shows examples of antenna port indexing in a cross-polarization antenna.

FIG. 11 shows an 8-port CSI-RS defined in 3GPP LTE system.

FIG. 12 shows CSI-RS pattern 1 per CSI-RS port number according to an embodiment of the present invention.

FIG. 13 shows CSI-RS pattern 2 per CSI-RS port number according to an embodiment of the present invention.

FIG. 14 shows CSI-RS pattern 3 per CSI-RS port number according to an embodiment of the present invention.

FIG. 17 shows an example of defining CSI-RS pattern 1 in unit of 2 RBs according to an embodiment of the present invention.

FIG. 18 shows IMR pattern 1 according to an embodiment of the present invention.

FIG. 19 shows IMR pattern 2 according to an embodiment of the present invention.

FIG. 20 shows an example of hopping of an IMR pattern according to an embodiment of the present invention.

BEST MODE FOR INVENTION

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition.

Moreover, in the present disclosure, a base station (eNB) may be used as a comprehensive term such as Remote Radio Head (RRH), eNB, Transmission Point (TP), Reception Point (RP), relay, etc.

Figure 1:
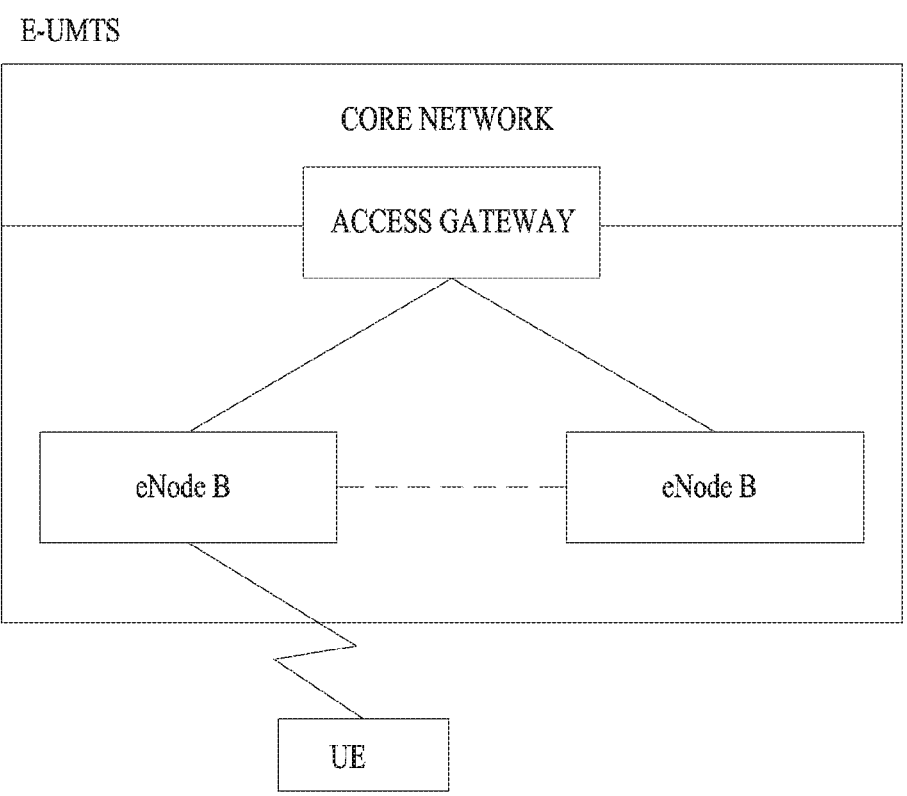
FIG. 1 is a diagram schematically illustrating a network structure of an E-UMTS as an exemplary radio communication system.
Figure 2:
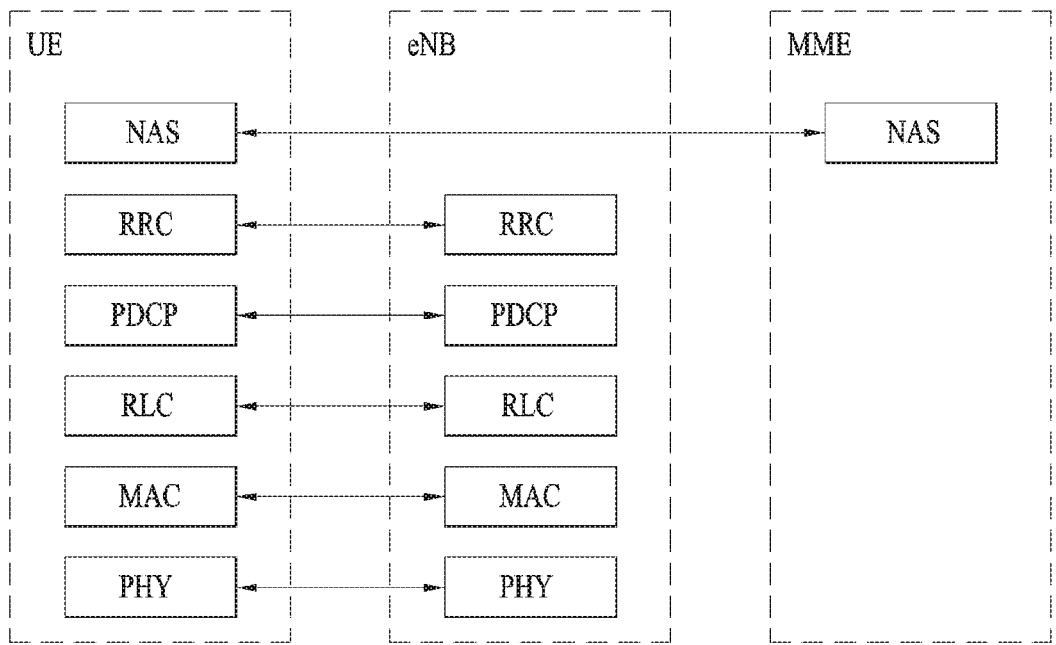
FIG. 2 is a diagram illustrating structures of a control plane and a user plane of a radio interface protocol between a UE and an E-UTRAN based on the 3GPP radio access network specification.
Figure 2:
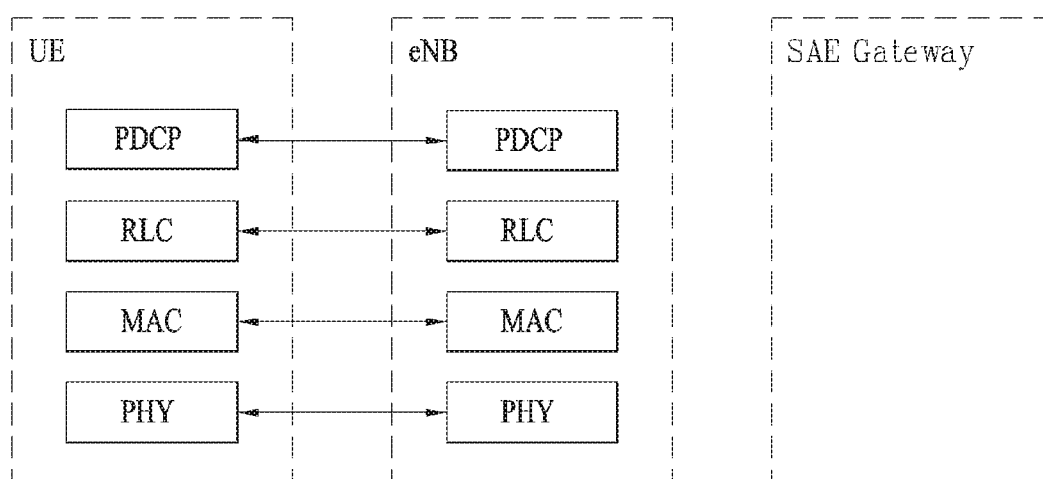

FIG. 2 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
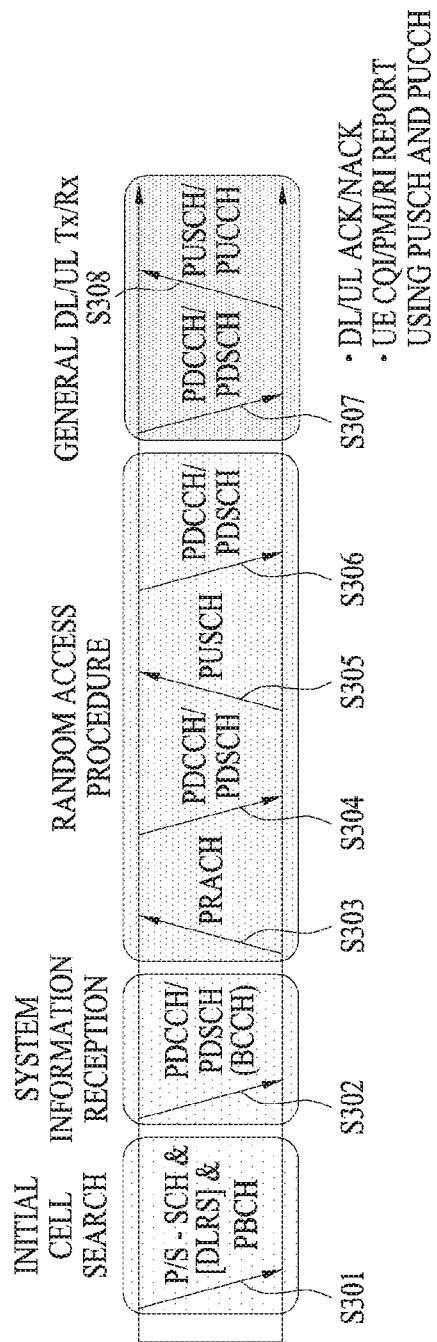
FIG. 3 is a diagram illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 4:
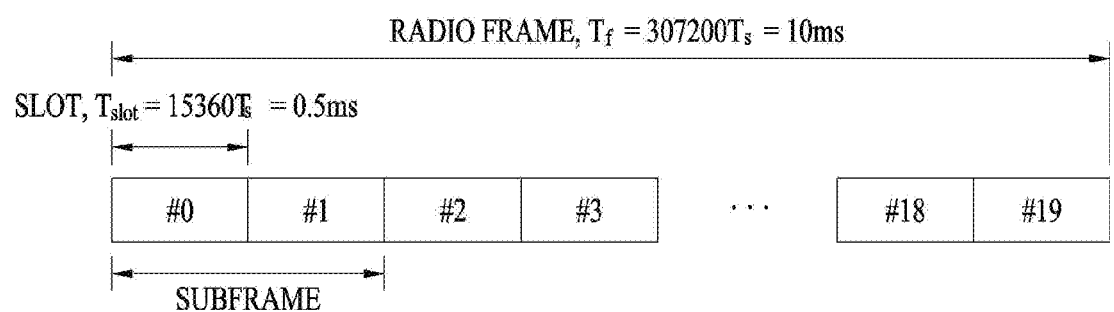
FIG. 4 is a diagram illustrating the structure of a radio frame used in an LTE system.

FIG. 4 is a view illustrating the structure of a radio frame used in an LTE system.

Referring to FIG. 4, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by Ts=1/(15 kHz×2048)=3.2552×10$^{-8}$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
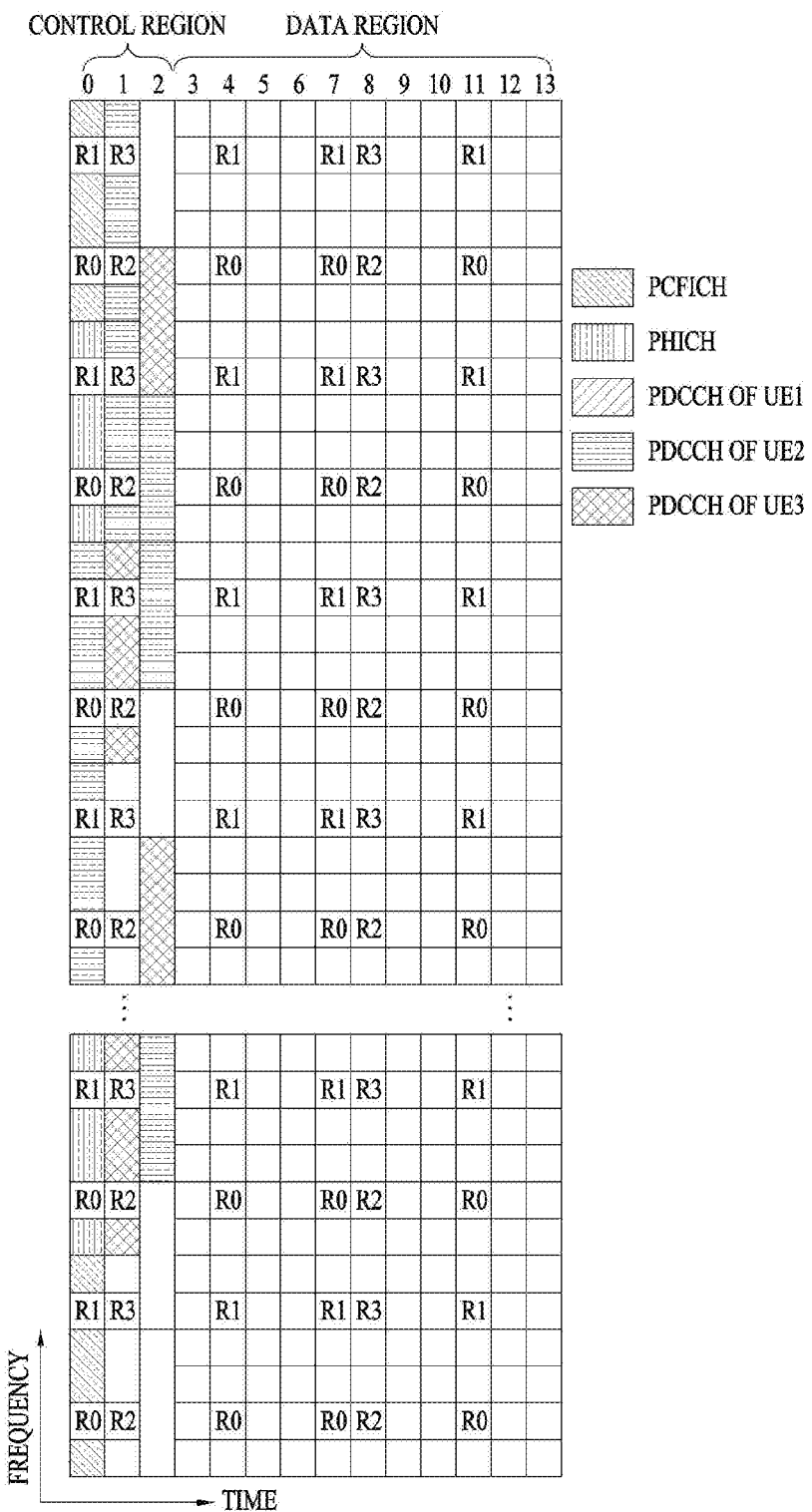
FIG. 5 is a diagram illustrating the structure of a DL radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier x one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
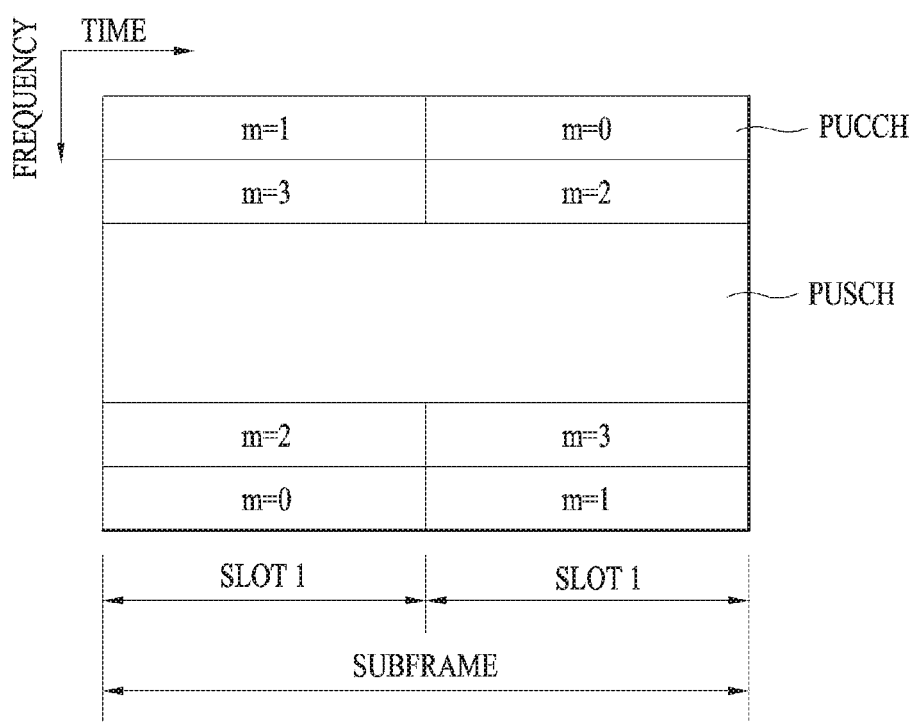
FIG. 6 is a diagram illustrating the structure of a UL subframe in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Channel State Information (CSI) reporting shall be described as follows. In the current LTE standard, there exist two kinds of transmission schemes such as open-loop MIMO operated without channel state information and closed-loop MIMO operated on the basis of channel state information. Particularly, each of a base station and a UE can perform beamforming based on channel state information in order to obtain a multiplexing gain of MIMO antenna. In order to obtain channel state information from the UE, the base station commands the UE to feed back Channel State Information (CSI) on a DL signal by assigning Physical Uplink Control Channel (PUCCH) or Physical Uplink Shared Channel (PUSCH) to the UE.

CSI may be mainly classified into three kinds of information such as Rank Indicator (RI), Precoding Matrix Index (PMI) and Channel Quality Indication (CQI). First of all, as described above, RI indicates rank information of channel and means the number of streams receivable by a UE through the same time-frequency resource. Since RI is determined by long term fading of a channel, it is fed back to a base station with a period longer than a PMI or CQI value in general.

Secondly, PMI is a value that reflects spatial property of a channel and indicates a precoding matrix index of a base station preferred by a UE with reference to a metric such as SINR or the like. Finally, CQI is a value indicating a strength of a channel and means a Received (Rx) SINR obtainable by a base station in using PMI in general.

In 3GPP LTE-A system, a base station may configure a multitude of CSI processes for a UE and receive a reporting of CSI for each CSI process. A CSI process is configured with a CSI-RS resource for signal quality specification from a base station and a CSI-Interference Measurement (CSI-IM) resource for interference measurement, i.e., Interference Measurement Resource (IMR).

As a wavelength gets shortened in Millimeter Wave (mmW), a multitude of antenna elements can be installed in the same area. Particularly, as a wavelength on 30-GHz band is 1 cm, total 64 (=8×8) antenna elements can be installed in form of 2D (dimension) array on a 4-by-4 (cm) panel in a manner of being spaced 0.5 lambda (wavelength) apart. Hence, according to the recent tendency in the mmW field, high coverage is increased by raising a BeamForming (BF) gain using a multitude of antenna elements or the increase of throughput is attempted.

In this case, if a Transceiver Unit (TXRU) is prepared to enable transmit power and phase adjustment per antenna element, independent beamforming is possible per frequency resource. Yet, if TXRUs are installed for about 100 antenna elements all, it causes a problem that effectiveness is lowered in price aspect. Hence, considered currently is a scheme of adjusting a direction of a beam with an analog phase shifter by mapping a multitude of antenna elements to a single TXRU. As such an analog beamforming scheme can make a single beam direction only on the total band, it is disadvantageous in that a frequency selective beamforming cannot be performed.

As an intermediate form between digital BF and analog BF, it is able to consider hybrid BF having B TXRUs of which number is smaller than Q that is the number of antenna elements. In this case, although there is a difference depending on a connecting scheme between B TXRUs and Q antenna elements, the number of beam directions capable of simultaneous transmissions is limited to B or less.

Figure 7:
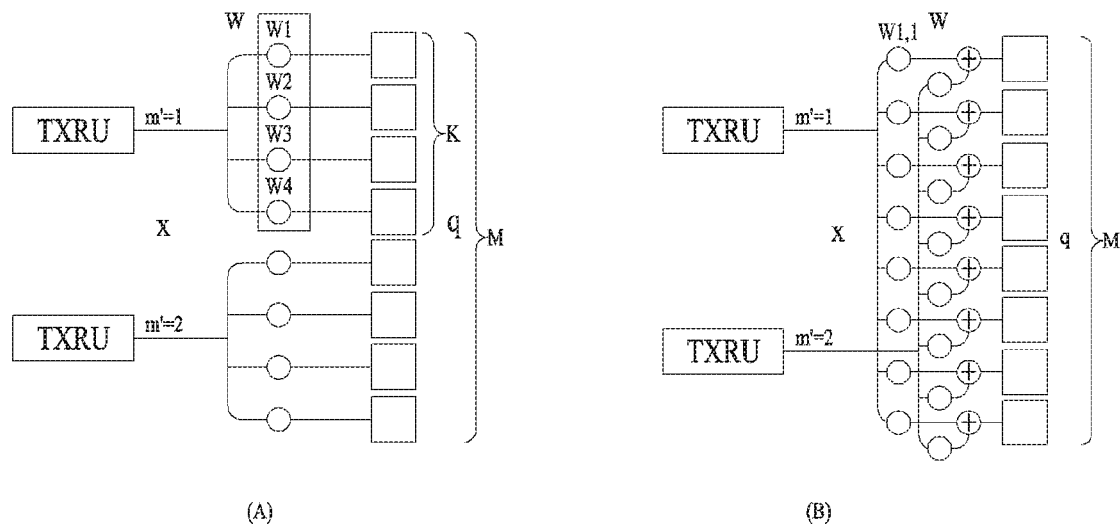
FIG. 7 shows examples of a scheme of connection between a TXRU and an antenna element.

FIG. 7 shows examples of a scheme of connection between a TXRU and an antenna element.

FIG. 7 (*a*) shows a scheme that a TXRU is connected to a subarray. In this case, an antenna element is connected to a single TXRU only. On the other hand, FIG. 9 (*b*) shows a scheme that an antenna element is connected to all TXRUs. In FIG. 9, W indicates a phase vector multiplied by a phase shifter. Namely, a direction of analog beamforming is determined by W. Here, mapping between a CSI-RS antenna port and TXRUs may include 1-to-1 or 1-to-many.

As numerous communication devices demand larger communication capacity, the necessity for wireless broadband communication improved in comparison with the legacy Radio Access Technology (RAT) is rising. And, massive Machine Type Communications (MTC), which provides various services anytime anywhere by connecting a multitude of devices and things, is one of the major issues that will be considered by the next generation communication as well. Moreover, a communication system design, which considers a service/UE sensitive to reliability and latency, is currently discussed. And, the introduction of the next generation RAT considering such facts is currently discussed, which shall be referred to as NewRAT in the present invention for clarity.

Figure 8:
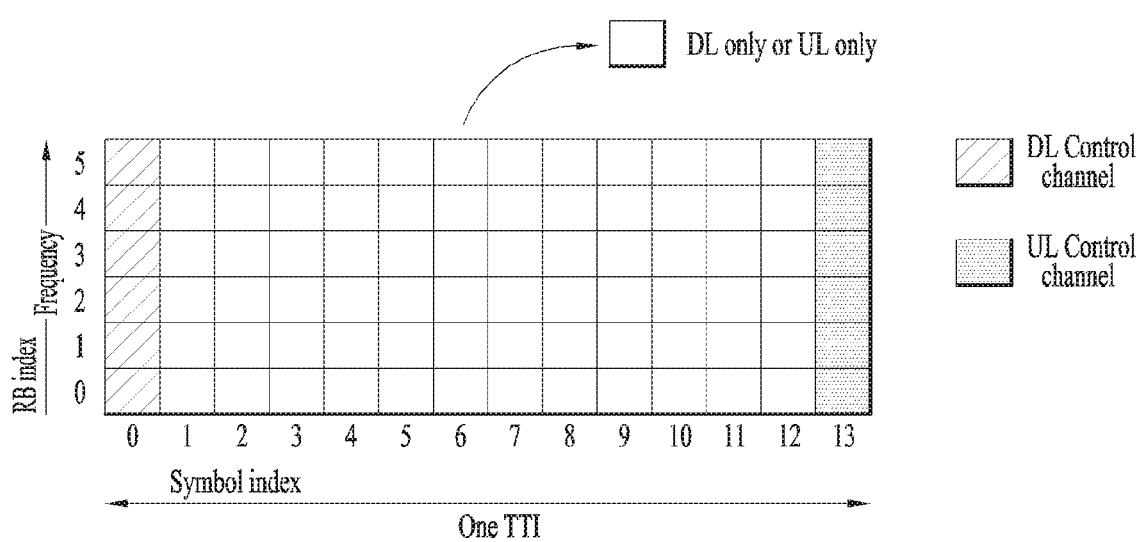
FIG. 8 shows one example of a self-contained subframe structure.

In order to minimize data transmission latency in a TDD system, the 5G NewRAT is considering such a self-contained subframe structure as shown in FIG. 8. FIG. 8 shows one example of a self-contained subframe structure.

In FIG. 10, a slashed region indicates a DownLink (DL) control region and a black part indicates an UpLink (UL) control region. A non-marked region may be used for DL data transmission or UL data transmission. Regarding features of this structure, as a DL transmission and a UL transmission are sequentially progressed in a single subframe, DL data may be sent in a subframe or UL ACK/NACK may be received in a subframe. Eventually, it is able to reduce a time taken to data retransmission in case of occurrence of data transmission error, whereby latency of final data forwarding can be minimized.

In such a self-contained subframe structure, a time gap for a process for a base station and UE to switch from a transmitting (Tx) mode to a receiving (Rx) mode or from an Rx mode to a Tx mode is necessary. To this end, some OFDM Symbol (OS) at a Downlink-to-Uplink (DL-to-UL) switching timing in a self-contained subframe structure is configured as a Guard Period (GP).

For one example of a self-contained subframe type configurable/settable in a NewRAT based operating system, at least 4 kinds of subframe type can be considered as follows.
DL control interval+DL data interval+GP+UL control interval
DL control interval+DL data interval
DL control interval+GP+UL data interval+UL control interval
DL control interval+GP+UL data interval FIG. 9 exemplarily shows a NewRAT corresponding subframe structure according to an embodiment of the present invention. Particularly, FIG. 9 shows an example of a subframe structure with reference to a single Resource Block (RB) configured with 12 Subcarriers (SCs) and 14 OSs.

In FIG. 9, OS 0 indicates a DL control channel and OS 1 to OS 11 are flexibly usable for UL or DL data transmission. Of course, in case of a use for UL data, as described above, a GP should exist after a DL control channel. Moreover, it is able to consider using OS 12 and OS 13 variously for UL control channel, SRS, GP, UL data, DL data and the like.

A resource location of CSI-RS used by a UE to measure CSI should be determined. For example, it is able to consider locating such a resource at an OFDM symbol (e.g., OS 1) located right after a DL control or a last located OFDM symbol (e.g., OS 12 and OS 13) of an RB. This is related to a subframe structure of NewRAT, and particularly, intended to design a subframe structure as simple as possible in a manner of disposing a resource available for various usages at a fore or aft OS of an RB. Alternatively, by disposing CSI-RS (or IMR) at a fore OS, it is intended to secure a time to be used for CSI calculation by a UE and feed back the calculated CSI quickly.

Meanwhile, regarding CSI-RS port indexing, it is necessary to consider the features of a cross-polarization antenna. FIG. 10 shows examples of antenna port indexing in a cross-polarization antenna.

FIG. 10 (a) shows one example of indexing a port denoted by '/' and a port denoted by '\' alternately. And, FIG. 10 (b) shows one example of indexing all ports marked with '/' and then indexing ports marked with '\'.

<NewRAT CSI-RS Configuration>

FIG. 11 shows an 8-port CSI-RS defined in 3GPP LTE system.

In FIG. 11, a different grid means a different CSI-RS resource and a numeral marked on each RE means a port index. Three 8-port CSI-RS resources may be defined in 8-RE unit so as to be allocated to OS 9 and OS 10. Such an LTE CSI-RS pattern can be exactly introduced in NewRAT. If CSI-RS is located at a rearmost OS, OX indexes x and y in FIG. 11 become 12 and 13, respectively. NewRAT 1-port CSI-RS, NewRAT 2-port CSI-RS and NewRAT 4-port CSI-RS can use 1-port CSI-RS pattern, 2-port CSI-RS pattern and 4-port CSI-RS pattern defined in OS 9 and OS 10 of the LTE system as they are.

In FIG. 11, since total 3 8-port CSI resource configurations are available, 3 adjacent cells (or TPs) use different CSI-RS resources, respectively and configure REs of the two remaining unused CSI-RS resources as ZP CSI-RS (or muting configuration), thereby performing transmissions without interference while securing orthogonality. Of course, in case of using a smaller number of ports, the number of CSI-RS resource configurations securing orthogonality can be increased.

On the other hand, if a CSI-RS pattern shown in FIG. 11 is defined, a single TP should transmit a CSI-RS resource in a single analog beam direction only in a single subframe. The reason for this is that each TP can perform transmission in a single analog beam direction only at a single timing by analog beamforming in mmW. More particularly, in FIG. 11, since each CSI-RS port is transmitted using both OS x and OS y, the same single analog beam should be applied to all CSI-RSs transmitted by a TP through OS x and OS y in a single subframe. Thus, a single TP in an mmWave system is unable to transmit multiple CSI-RS resources having different analog beams applied thereto in a single subframe. Due to such restriction, system performance may be degraded.

To solve such a problem, the following CSI-RS patterns are proposed. Particularly, the following is illustrated with reference to OS x and OS y in 1 RB. In case of using multiple RBs, it can be repeatedly used in OS x and OS y per RB. Meanwhile, in order to define more CSI-RS resources, locations of OS x and OS y may differ per cell or UE and may be determined and provided to a UE by a base station through RRC signaling and the like. Moreover, although FIG. 12 exemplarily shows a CSI-RS pattern for two OSs, it can be extended for an arbitrary OS number. Namely, a CSI-RS pattern may be defined in a single OS (e.g., OS x) only. Yet, in case of 16-port CSI-RS, ports 0 to 7 need to be changed so as to be transmitted on RB of an even index of OS x and ports 8 to 15 need to be changed so as to be transmitted on RB of an odd index of the OS x. Moreover, it is able to define more CSI-RS resources by adding the same pattern to three OSs or more. Preferably, all CSI-RS resource patterns and IMR patterns proposed in the present specification may define CSI-RS resource or IMR in the same manner.

FIG. 12 shows CSI-RS pattern 1 per CSI-RS port number according to an embodiment of the present invention. In FIG. 12, a different grid means a different CSI resource.

Referring to FIG. 12, each CSI-RS port is transmitted through adjacent multiple SCs located at a single OS and spread using a length 2 Orthogonal Cover Code (OCC) for multiplexing with another port (transmitted through the same RE). And, a single CSI-RS resource configured with 8 ports or less is transmitted in one of OS x and OS y. As a result, when a TP transmits a CSI-RS resource of 8 ports or less, two CSI-RS resources having different analog beams applied thereto can be transmitted together in a single subframe. For example, a single TP transmits 8-port CSI-RS having analog beam 1 applied thereto in OS x and also transmits 8-port CSI-RS having analog beam 2 applied thereto in OS y located in the same subframe.

Although length 2 OCC is applied to pattern 1 in FIG. 12, it is able to raise an SNR gain due to despreading by applying OCC 4 (=length 4 OCC). For example, in 16-port CSI-RS, ports 0, 1, 4 and 5 transmitted on an adjacent SC in a same OS are spread by applying length 4 OCC thereto and then transmitted by being multiplexed through SCs 0 to 3 in OS x. Ports 2, 3, 6 and 7 have length 4 OCC applied thereto and are then transmitted by being multiplexed through SCs 6 to 9 in OS x. Ports 8, 9, 12 and 13 have length 4 OCC applied thereto and are then transmitted by being multiplexed through SCs 0 to 3 in OS y. And, ports 10, 11, 14 and 15 have length 4 OCC applied thereto and are then transmitted by being multiplexed through SCs 6 to 9 in OS y.

In 8-port CSI-RS, each of ports 0, 1, 4 and 5 transmitted on an adjacent SC in a same OS has length 4 OCC applied thereto and is then transmitted by being multiplexed through SCs 0 to 3 in OS x. Moreover, each of ports 2, 3, 6 and 7 has length 4 OCC applied thereto and are then transmitted by being multiplexed through SCs 6 to 9 in OS x.

In 4-port CSI-RS, ports 0 to 3 transmitted in a same OS have length 4 OCC applied thereto and are then transmitted by being multiplexed through SCs 0, 1, 6 and 7 in OS x.

In case of 16-port CSI-RS, since it is transmitted through 16 REs, only one CSI-RS resource securing orthogonality is defined for one RB. Hence, to minimize CSI-RS collision between adjacent TPs, it is able to differentiate an SC mapping start point of 16-port CSI-RS resource per TP. For example, as shown in the drawing, TP 1 transmits 16-port CSI resource of which mapping starts at SC 0, and TP 2 transmits 16-port CSI resource of which mapping starts at SC 2. Namely, TP 2 transmits CSI-RS using SCs 2, 3, 4, 5, 8, 9, 10 and 11.

Or, to minimize CSI-RS collision between adjacent TPs, it is able to differently designate an RB, on which 16-port CSI-RS resource is transmitted, per TP. For example, TP 1 transmits CSI-RS for an RB of an even index only and TP 2 transmits CSI-RS for an RB of an odd index only, whereby orthogonality can be secured. Yet, in this case, channel estimation performance degradation may occur due to reduction of RS density. Likewise, it is also able to increase the number of CSI-RS resources capable of securing orthogonality in the same manner for 8-port CSI-RS, 4-port CSI-RS, 2-port CSI-RS or 1-port CSI-RS.

By generalizing this, it is able to increase the number of CSI-RS resources in a manner of defining RB group I by collecting RBs satisfying n % K=i (where, n is an RB index, K is an arbitrary constant, and i indicates an RB group index greater than 0 and smaller than K) and defining an independent CSI-RS resource per RB group.

For example, when a system BandWidth (BW) is 20 RBs and K is 4, RB groups 0 to 3 are defined and each RB group is defined with 5 RBs. An independent 16-port CSI-RS resource can be defined per RB group. And, a single 16-port CSI-RS resource exists per 4 RBs. Thus, CSI-RS resources increased through Frequency Division Multiplexing (FDM) may be used for CSI-RS resource allocation capable of securing orthogonality between adjacent cells and available for a case that several CSI-RS resources capable of securing orthogonality are required in a single cell.

FDM scheme is exemplarily applied to CSI-RS pattern 1. The FDM scheme can be applied to a random pattern. And, the FDM scheme is applicable to other random resource configurations (e.g., IMR configuration) as well as to CSI-RS.

In case that each of TP 1 and TP 2 transmits 8-port CSI-RS to a single UE, one 16-port CSI-RS is configured for the UE. The TP 1 may transmit ports 0 to 7 of the 16-port CSI-RS, and the TP 2 may transmit ports 8 to 15 of the 16-port CSI-RS.

Or, in order to minimize CSI-RS collision between adjacent TPs, each TP share resource location (i.e., CSI-RS pattern, subframe period, subframe offset, etc.) of CSI-RS caught in analog beamforming toward a cell edge. For example, when TP 1 and TP 2 are adjacent to each other, a resource location of CSI-RS caught in analog beamforming toward two cell edge among CSI-RSs of the TP 1 is shared with the TP 2. The TP 2 disposes CSI-RS caught in analog beamforming toward two cell edge among CSI-RSs of its own to a different resource or disposes CSI-RS caught in analog beamforming not toward the two cell edge among the CSI-RSs of its own to such a resource, whereby collision is minimized. In a CSI-RS pattern described in the following, it is able to minimize CSI-RS collision between adjacent TPs through the same operation.

Moreover, an RB carrying a 16-port CSI-RS resource can be designated per TP differently. For example, TP 1 transmits CSI-RS for an RB of an even index only and TP 2 transmits CSI-RS for an RB of an odd index only, whereby orthogonality can be secured. Likewise, it is also able to increase the number of CSI-RS resources capable of securing orthogonality in the same manner for 8-port CSI-RS, 4-port CSI-RS, 2-port CSI-RS or 1-port CSI-RS. Yet, in this case, channel estimation performance degradation may occur due to reduction of RS density. In case that each of TP 1 and TP 2 transmits 8-port CSI-RS to a single UE, one 16-port CSI-RS is configured for the UE. The TP 1 may transmit ports 0 to 7 of the 16-port CSI-RS, and the TP 2 may transmit ports 8 to 15 of the 16-port CSI-RS.

In case of 8-port CSI-RS, since it is transmitted through 8 REs located at a single OS, two CSI-RS resources securing orthogonality are defined for one RB. In order to minimize CSI-RS collision between adjacent TPs, it is able to differentiate an SC mapping start point of 8-port CSI-RS resource per TP. For example, as shown in FIG. 12, TP 1 transmits 8-port CSI resource of which mapping starts at SC 0, and TP 2 transmits 8-port CSI resource of which mapping starts at SC 2. Namely, the TP 2 transmits CSI-RS using SCs 2, 3, 4, 5, 8, 9, 10 and 11. If each of TP 1 and TP 2 transmits 8-port CSI-RS to a single UE, one 8-port CSI-RS is configured for the UE. The TP 1 may transmit ports 0 to 7 in OS x and the TP 2 may transmit ports 0 to 7 in OS y. The UE adjusts a port index of the OS y into ports 8 to 15 by adding +8 thereto and then aggregates two 8-port CSI-RSs of the OS x and the OS y, thereby interpreting the aggregated one as 16-port CSI-RS.

In case of 4-port CSI-RS, six CSI-RS resources securing orthogonality are defined for a single RB. In case of 8-port CSI-RS or 16-port CSI-RS, although CSI-RS is not defined on SC 4, SC 5, SC 10 and SC 11, CSI-RS can be used in a manner of being defined on a corresponding SC for port 4 or below like FIG. 12.

In case of 1-port CSI-RS or 2-port CSI-RS, 12 CSI-RS resources securing orthogonality are defined for a single RB. In case of 1-port CSI-RS, as shown in FIG. 12, port 1 disappears but port 0 remains only.

In the above-described CSI-RS pattern 1, each CSI-RS port can perform power boosting by borrowing transmit power from REs in the same OS not transmitting the corresponding CSI-RS port. For example, when RS of port 0 in 8-port CSI-RS is transmitted on SC 0 and SC 1 in OS x, power boosting can be performed by borrowing transmit power from REs corresponding to the remaining SC in the OS x. When an average transmit power of a signal transmitted through port 0 in OS x is defined as 1, CSI-RS of port 0 can be transmitted with a transmit power of 6 through such power boosting. The remaining ports of the 8-port CSI-RS, i.e., ports 1 to 7 can be power-boosted. By the same principle, 16-port CSI-RS, 4-port CSI-RS, 2-port CSI-RS and 1-port CSI-RS can be power-boosted as well.

FIG. 13 shows CSI-RS pattern 2 per number of CSI-RS ports according to an embodiment of the present invention.

Referring to FIG. 13, each CSI-RS port is transmitted through adjacent multiple SCs located in a single OS and spread using length 3 OCC for multiplexing with another port (transmitted through the same resource). And, a single CSI-RS resource configured with 8 ports or less is transmitted in either OS x or OS y. As a result, when a TP transmits CSI-RS resource of 8 ports or less, it is able to transmit two CSI-RS resources having different analog beams applied thereto in a single subframe together. For example, one TP transmits 8-port CSI-RS resource having analog beam 1 applied thereto in OS x and 8-port CSI-RS resource having analog beam applied thereto in OS y located at the same subframe.

In case of 16-port CSI-RS, since it is transmitted through 24 REs, only one CSI-RS resource securing orthogonality is defined for a single RB. To minimize CSI-RS collision between adjacent TPs, an RB carrying a 16-port CSI-RS resource can be designated per TP differently. For example, TP 1 transmits CSI-RS for an RB of an even index only and TP 2 transmits CSI-RS for an RB of an odd index only, whereby orthogonality can be secured. Likewise, it is also able to increase the number of CSI-RS resources capable of securing orthogonality in the same manner for 8-port CSI-RS, 4-port CSI-RS, 2-port CSI-RS or 1-port CSI-RS. Yet, in this case, channel estimation performance degradation may occur due to reduction of RS density. In case that each of TP 1 and TP 2 transmits 8-port CSI-RS to a single UE, one 16-port CSI-RS is configured for the UE. The TP 1 may transmit ports 0 to 7 of the 16-port CSI-RS, and the TP 2 may transmit ports 8 to 15 of the 16-port CSI-RS.

In case of 8-port CSI-RS, since it is transmitted through 12 REs located at a single OS, two CSI-RS resources securing orthogonality are defined for one RB. If each of TP 1 and TP 2 transmits 8-port CSI-RS to a single UE, two 8-port CSI-RSs are configured for the UE. The TP 1 may transmit ports 0 to 7 in OS x and the TP 2 may transmit ports 0 to 7 in OS y. The UE adds +8 to a port index of the OS y (i.e., adjusts a port index of the OS y into ports 8 to 15) and then aggregates two 8-port CSI-RSs of the OS x and the OS y, thereby interpreting the aggregated one as 16-port CSI-RS.

In case of 4-port CSI-RS, four CSI-RS resources securing orthogonality are defined for a single RB. In cases of 1-port CSI-RS and 2-port CSI-RS, 8 CSI-RS resources securing orthogonality are defined for a single RB. In case of 1-port CSI-RS, as shown in FIG. 13, port 1 disappears but port 0 remains only.

In the pattern 2 of FIG. 13, each CSI-RS port can perform power boosting by borrowing transmit power from Res in the same OS not transmitting the corresponding CSI-RS port. For example, when RS of port 0 in 8-port CSI-RS is transmitted on SC 0, SC 1 and SC 2 in OS x, power boosting can be performed by borrowing transmit power from REs corresponding to the remaining SC in the OS x. When an average transmit power of a signal transmitted through port 0 in OS x is defined as 1, CSI-RS of port 0 can be transmitted with a transmit power of 4 through such power boosting. On the other hand, in the pattern 1 of FIG. 12, since the CSI-RS of the port 0 is transmitted with the transmit power of 6, a boosting effect is increased.

Since OCC lengths of the patterns 1 and 2 are 2 and 3, respectively, the pattern 1 and the pattern 2 obtain a double SNR gain and a triple SNR gain through OCC dispreading, respectively. Eventually, considering both of the effect of RS power boosting and the effect of OCC dispreading, final SNR gains of per-port CSI-RS of the patterns 1 and 2 are equal to each other. The remaining ports of the 8-port CSI-RS, i.e., ports 1 to 7 can be power-boosted and OCC-despread likewise. And, 16-port CSI-RS, 4-port CSI-RS, 2-port CSI-RS and 1-port CSI-RS can be power-boosted and OCC-despread by the same principle.

FIG. 14 shows CSI-RS pattern 3 per CSI-RS port number according to an embodiment of the present invention.

Referring to FIG. 14, each CSI-RS port is transmitted on a single SC in a single OS (i.e., through a single RE). And, each port is transmitted through a different RE. And, a single CSI-RS resource configured with 8 ports or less is transmitted in either OS x or OS y. As a result, when a TP transmits a CSI-RS resource of 8 ports or less, two CSI-RS resources having different analog beams applied thereto can be transmitted together in a single subframe. For example, a single TP transmits an 8-port CSI-RS resource having analog beam 1 applied thereto in OS x and also transmits an 8-port CSI-RS resource having analog beam 2 applied thereto in OS y located in the same subframe.

In case of 16-port CSI-RS, since it is transmitted through 16 REs, only one CSI-RS resource securing orthogonality is defined for one RB. Hence, to minimize CSI-RS collision between adjacent TPs, it is able to differentiate an SC mapping start point of 16-port CSI-RS resource per TP. For example, as shown in FIG. 14, TP 1 transmits 16-port CSI resource of which mapping starts at SC 0, and TP 2 transmits 16-port CSI resource of which mapping starts at SC 2. Namely, TP 2 transmits CSI-RS using SCs 2, 3, 4, 5, 8, 9, 10 and 11. Or, to minimize CSI-RS collision between adjacent TPs, it is able to differently designate an RB, on which 16-port CSI-RS resource is transmitted, per TP. For example, TP 1 transmits CSI-RS for an RB of an even index only and TP 2 transmits CSI-RS for an RB of an odd index only, whereby orthogonality can be secured. Likewise, it is also able to increase the number of CSI-RS resources capable of securing orthogonality in the same manner for 8-port CSI-RS, 4-port CSI-RS, 2-port CSI-RS or 1-port CSI-RS. Yet, channel estimation performance may be degraded due to RS density reduction. In case that each of TP 1 and TP 2 transmits 8-port CSI-RS to a single UE, one 16-port CSI-RS is configured for the UE. The TP 1 may transmit ports 0 to 7 of the 16-port CSI-RS, and the TP 2 may transmit ports 8 to 15 of the 16-port CSI-RS.

In case of 8-port CSI-RS, since it is transmitted through 8 REs located at a single OS, two CSI-RS resources securing orthogonality are defined for one RB. In order to minimize CSI-RS collision between adjacent TPs, it is able to differentiate an SC mapping start point of 8-port CSI-RS resource per TP. For example, as shown in FIG. 12, TP 1 transmits 8-port CSI resource of which mapping starts at SC 0, and TP 2 transmits 8-port CSI resource of which mapping starts at SC 2. Namely, the TP 2 transmits CSI-RS using SCs 2, 3, 4, 5, 8, 9, 10 and 11. If each of TP 1 and TP 2 transmits 8-port CSI-RS to a single UE, two 8-port CSI-RSs are configured for the UE. The TP 1 may transmit ports 0 to 7 in OS x and the TP 2 may transmit ports 0 to 7 in OS y. The UE adds +8 to a port index of the OS y (i.e., adjusts the port index of the OS y into ports 8 to 15) and then aggregates two 8-port CSI-RSs of the OS x and the OS y, thereby interpreting the aggregated one as 16-port CSI-RS.

In case of 4-port CSI-RS, six CSI-RS resources securing orthogonality are defined for a single RB. In case of 8-port CSI-RS or 16-port CSI-RS, although CSI-RS is not defined on SC 4, SC 5, SC 10 and SC 11, CSI-RS can be used in a manner of being defined on a corresponding SC for port 4 or below like FIG. 14.

In case of 1-port CSI-RS or 2-port CSI-RS, 12 CSI-RS resources securing orthogonality are defined for a single RB. In case of 1-port CSI-RS, as shown in FIG. 14, port 1 disappears but port 0 remains only.

In the pattern 3 of FIG. 14, each CSI-RS port can perform power boosting by borrowing transmit power from REs in the same OS not transmitting the corresponding CSI-RS port. For example, when RS of port 0 in 8-port CSI-RS is transmitted on SC 0 in OS x, power boosting can be performed by borrowing transmit power from REs corresponding to the remaining SC in the OS x. When an average transmit power of a signal transmitted through port 0 in OS x is defined as 1, CSI-RS of port 0 can be transmitted with a transmit power of 12 through such power boosting. Unlike the pattern 1 or 2, since OCC spreading is not applied to the pattern 3, it is unable to expect an SNR gain through dispreading. If frequency selectivity is high, since it is unable to use Code Domain Multiplexing (CDM) due to OCC scrambling, the pattern 3 is more suitable than the pattern 1 or the pattern 2. The remaining ports of the 8-port CSI-RS, i.e., ports 1 to 7 can be power-boosted as well. By the same principle, 16-port CSI-RS, 4-port CSI-RS, 2-port CSI-RS and 1-port CSI-RS can be power-boosted as well.

Meanwhile, the CSI-RS pattern described with reference to FIGS. 12 to 14 can be mapped to RE by generating an RS sequence with PN code. Besides, it is able to generate CSI-RS using such a sequence as CAZAC that is utilized as an RS sequence of a UL DM-RS or SRS. And, it is able to secure orthogonality of CSI-RS per CSI-RS port or cell through Cyclic Shift (CS) and Transmission Comb (TC).

Figures 15, 16:
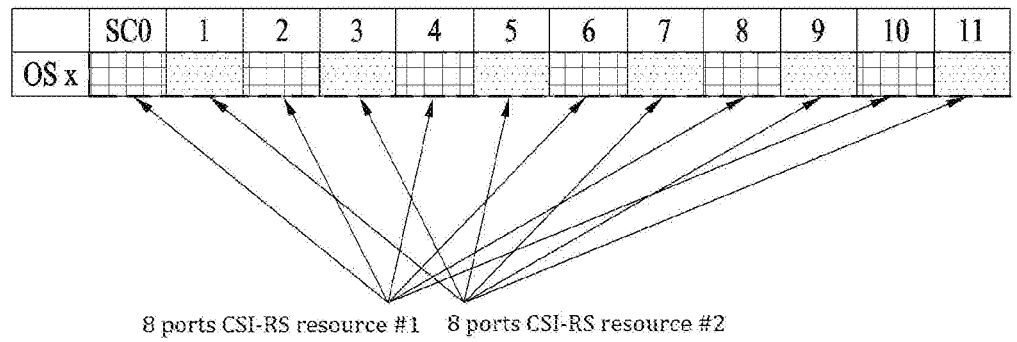
FIG. 15 and FIG. 16 show examples of a mapping scheme of a CSI-RS sequence according to an embodiment of the present invention, respectively.

FIG. 15 and FIG. 16 show examples of a mapping scheme of a CSI-RS sequence according to an embodiment of the present invention, respectively.

FIG. 15 shows 8-port CSI-RS transmitted on the full frequency band of OS x after generating a CSI-RS sequence with CAZAC. Each port is transmitted through a different CS by securing orthogonality. FIG. 16 shows 8-port CSI-RS transmitted on SC of an even index of OS x and 8-port CSI-RS transmitted on SC of an odd index after generating a CSI-RS sequence with CAZAC. The two CSI-RS resources are transmitted by securing orthogonality through TC. And, each port is transmitted by securing orthogonality through a different CS.

In case of 16- or 8-port CSI-RS in pattern 1 or pattern 3, when CSI-RS is defined for 1 RB, REs (e.g., SC 4, SC 5, SC 10 and SC 11) unusable as CSI-RS are generated. In order to define CSI-RS resource more efficiently, such unusable REs are preferably removed. As a method, it is able to define CSI-RS resource in 2-RB unit.

FIG. 17 shows an example of defining CSI-RS pattern 1 in unit of 2 RBs according to an embodiment of the present invention.

When a system BW is N RBs, a CSI-RS resource of FIG. 17 repeatedly appears every 2 contiguous RBs. Likewise, for a pattern 3, it is able to configure a CSI-RS resource in 2-RB unit. Although total four 8-port CSI-RS resources can be configured in the existing pattern 1 diagrammatized in FIG. 12, total six 8-port CSI-RS resources can be configured in FIG. 17. Yet, since a resource is defined in 2-RB unit in aspect of a single CSI-RS resource, CSI-RS density becomes lower than that of the existing pattern 1, whereby channel estimation performance is lowered eventually. Particularly, although RS density of the existing pattern 1 is 1 RE per 1 port considering a single RB only, it is reduced into 0.5 RE per 1 port considering a single RB in FIG. 17.

Although multiplexing is performed on 2 REs by applying OCC 2 in unit of 2 ports in FIG. 17, multiplexing can be performed on 4 REs by applying length 4 OCC in unit of 4 ports. For example, ports 0, 1, 4 and 5 are multiplexed and transmitted on SCs 0 to 3 of OS x by applying length 4 OCC to each of the ports 0, 1, 4 and 5, and ports 2, 3, 6 and 7 are multiplexed and transmitted on SCs 4 to 7 of the OS x by applying OCC 4 to each of the ports 2, 3, 6 and 7.

In all cases except 16 ports in a CSI-RS pattern proposed by the present invention, a single CSI-RS resource is defined within a single OS. Alternatively, some ports configuring a single CSI-RS resource may be defined in a subframe #n (or OS n) and the remaining ports may be defined in a subframe m (or OS m). Yet, due to an oscillator error of a Doppler frequency or a transmission RF for (m−n) time, it may cause a problem that a phase of a received signal is changed. Namely, a phase drift is generated. The phase drift is generated more considerably in a high-frequency high-speed environment. Namely, a phase drift is generated between a channel $H_m$ estimated at a timing m and a channel $H_n$ estimated at a timing n and a UE generates a final channel by aggregating $H_m$ and $H_n$ together (e.g., aggregation in form of [Hm Hn]) without compensation for the phase drift. Thereafter, as the UE selects a PMI with reference to the aggregated channel having a phase drift exist between port groups, an incorrect PMI is fed back. Hence, it is preferable that (n−m) gets smaller. And, it is most preferable that n is equal to m (i.e., n=m).

<NewRAT IMR Configuration>

In the aforementioned patterns 1 and 3, in case of 8-port CSI-RS resource or 16-port CSI-RS resource, RS is not transmitted on some SCs, e.g., SC 4, SC 5, SC 10 and SC 11. Of course, in case of a CSI-RS resource of 4 ports or less in pattern 1 or pattern 3, by excluding SCs 4, 5, 10 and 11 from CSI-RS resource candidates, it is able to guarantee that RS is not transmitted on SC 4, SC 5, SC 10 and SC 11. A serving TP may mute such an RE and define it as IMR. And, a UE may measure an interference signal from the corresponding RE. For example, a UE having 8-port CSI-RS configured in OS x estimates a channel through CSI-RS of the OS x and measures an interference power from an RE (e.g., SC 4, SC 5, SC 10 and SC 11) on which CSI-RS is not transmitted within the OS x, thereby calculating CSI.

Yet, if the OS x includes one of OS 12 and OS 13, an interference power measured through the above-proposed IMR may not include an interference power attributed to data transmission of an adjacent TP. As described above, the reason for this is that OS 12 and OS 13 can be used for various usages such as UL control channel, SRS, GP, UL data, DL data, CSI-RS, IMR and the like. In case that a CSI-RS resource defined OS x is located at a fore side on RB like OS 2, it is able to reduce the kinds of interference signals measured through IMR. An adjacent TP can use OS 2 for the usages of UL data, DL data, CSI-RS, and IMR.

Considering the various subframe structures within RB described with reference to FIG. 9, when a UE receives DL data, interference received from an adjacent TP mostly include DL or UL data of the adjacent TP. The reason for this is that interference received as IL control channel, SRS, CSI-RS and the like of the adjacent TP is limited to a prescribed small number of REs. Hence, when an RE location of IMR is determined, it is preferable that limitation is put on an RE that can be used for the usage of DL or UL data only. For example, CSI-RS is located in OS 12 and OS 13 and IMR is located in OS 2 to OS 11 after OS for a DL control channel and GP. For example, IMR may be located in OS 6 and OS 7 (i.e., z=6, w=7) near a middle OS of a single RB.

FIG. 18 shows IMR pattern 1 according to an embodiment of the present invention. FIG. 19 shows IMR pattern 2 according to an embodiment of the present invention.

OS z and OS w are located in OS 2 to OS 11, and more particularly, in an adjacent OS or a far OS. In FIG. 18 and FIG. 19, a single IMR includes 4 REs. And, a numeral written on an RE means an IMR index. For example, in IMR pattern 1 shown in FIG. 18, IMR 0 is configured with 4 REs including SC 0, SC 3, SC 6 and SC 9 in OS x.

To define more IMRs, locations of OS z and OS w may differ per cell or UE and be provided to a UE through RRC signaling by being determined by a base station. Moreover, although FIG. 18 or FIG. 19 shows an IMR pattern for two OSs, more IMRs can be defined in a manner of extending such a pattern for an arbitrary OS number. Namely, an IMR pattern may be determined for a single OS (e.g., OS z) only, or more IMRs can be defined by adding the same pattern for 3 OSs or more.

As IMR pattern 1 is used, a UE measures interference in a single analog beam and reflects it in CSI. For example, when there exists a TP causing considerable interference (i.e., a dominant interference TP), it is able to measure interference in a specific single analog beam used by the corresponding TP. Hence, as a serving TP and an interference TP coordinate an analog beam with each other, if they are aware that a prescribed analog beam is used in a specific OS, a base station can receive a report of CSI when interference is caused by a specific analog beam. On the other hand, as a single IMR is defined across two OSs, IMR pattern 2 measures average interference in two analog beams. If a serving TP and an interference TP do not coordinate an analog beam with each other and are not aware that a prescribed analog beam is used in a specific OS, CSI error can be reduced by receiving CSI in a manner of averaging a multitude of the analog beam interferences.

A base station may determine one of IMR pattern 1 and IMR pattern 2 and one of CSI-RS pattern 1 to CSI-RS pattern 3 and provide them to a UE UE-specifically or cell-specifically through RRC signaling or the like.

The IMR is preferably configured so as to be orthogonal between adjacent base stations causing interference to each other. In case that IMR overlaps between base stations adjacent to each other, it is unable to measure interference from the adjacent base station. Since the above-described IMR patterns are assigned to an RE at which the respective IMRs are orthogonal to each other, IMR configuration with an adjacent base station may be orthogonal in the best case.

Yet, in the worst case, as IMR configuration with an adjacent base station overlaps completely, interference measurement may be incorrect. To avoid such a worst case, IMR can be defined to hop in a specific RE region. For example, each IMR x is defined as 4 REs in an RE region belonging to OS 6 to OS 9, as shown in FIG. 20. And, locations of the 4 REs are determined using a specific random function f(x). Moreover, it is able to randomize a location of an IMR between base stations by defining the f(s) per base station differently. Preferably, by taking a cell ID of a base station as a seed, f(x) may be determined.

<NewRAT CSI-RS & IMR Configuration>

Figure 21:
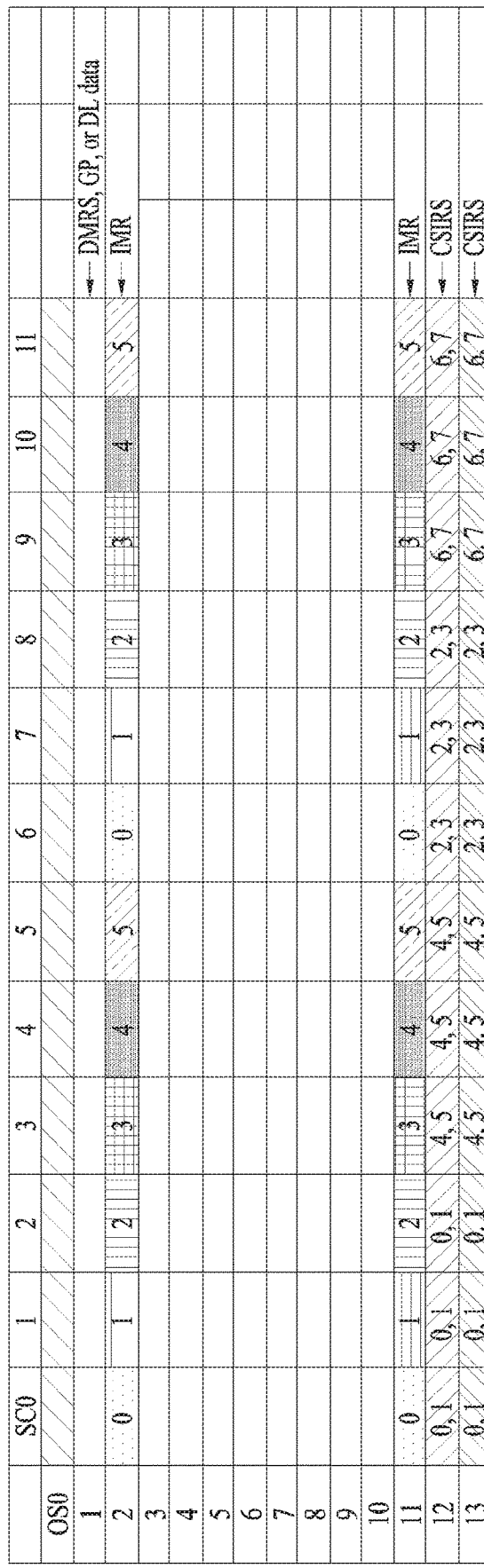
FIG. 21 shows one example of NewRAT CSI-RS and IMR configurations according to an embodiment of the present invention.

FIG. 21 shows one example of NewRAT CSI-RS and IMR configurations according to an embodiment of the present invention. Particularly, FIG. 21 shows an example that the aforementioned CSI-RS pattern 2 (8-port CSI-RS) and IMR pattern 2 are diagrammatized with reference to a single RB.

IMR overhead is configured with 4 REs per RB. And, in order to measure interference from various frequency-time resources by distributing the 4 REs within a data transmission region, IMR is defined in OS 2 and OS 11. In case of a shortage of IMR, a similar pattern is repeated in another OS so as to be configured as IMR. CSI-RS is defined in OS 12 and OS 13 for the purpose of simplification of a subframe structure.

In FIG. 21, when UL or DL data is transmitted together with CSI-RS or IMR, a transmitting end does not transmit data on a resource configured as CSI-RS and a receiving end does not receive data on a resource configured as IMR and CSI-RS. Namely, a rate matching is performed. To this end, a base station should inform a UE of locations of IMR and CSI-RS resource supposed to be rate-matched in UL/DL data through DCI, RRC signaling or the like.

Particularly, candidate sets of the IMR and the CSI-RS resource supposed to be rate-matched are defined through RRC signaling. For example, Set 0={IMR 0, CSI-RS 0} and Set 1={IMR 1, CSI-RS 1} are defined, and a UE is informed that IMR and CSI-RS corresponding to a prescribed set in a specific subframe should be rate-matched, through a specific field of DCI. Here, the specific subframe basically means a subframe in which the DCI exists. More flexibly, a specific frame may be designated through the DCI.

When a UE performs UL Data transmission, if the UE illustrates a rate matching process, a base station should inform the UE of resource locations of IMR and CSI-RS resource supposed to be rate-matched in UL data as well as a UL grant through DCI. Such a rate matching operation is non-limited by specific IMR and CSI-RS patterns proposed in the present specification and may operate in the same manner for random IMR and CSI-RS patterns. The UE transmits UL data by rate-matching CSI-RS and IMR used by the UE for CSI measurement together with rate matching information (i.e., rate matching information on CSI-RS and IMR configured for another UE) received through the DCI.

In case that a UE transmits UL data on an RB at which IMR configured for the UE is located, the UL data is not assigned to a position of the IMR through the rate matching. Nonetheless, the UE is unable to measure interference in the corresponding RB using the IMR. The reason for this is that a predetermined time (GP) is necessary for the UE to switch to UL data transmission from IMR reception. Hence, for CSI calculation, the UE should not use IMR existing in an RB on which the UE transmits UL data. for example, assuming that a CSI reference subframe of a specific UE is subframe #n, if IMR is configured for the UE by 5-subframe period, when the UE transmits UL data in the subframe #n, the UE measures interference in another IMR except IMR located in the subframe #n.

In FIG. 21, when DL data is transmitted together with CSI-RS or IMR, OS 1 is usable for DL data or DM-RS transmission. When UL data is transmitted, OS 1 is used as a GP.

Figure 22:
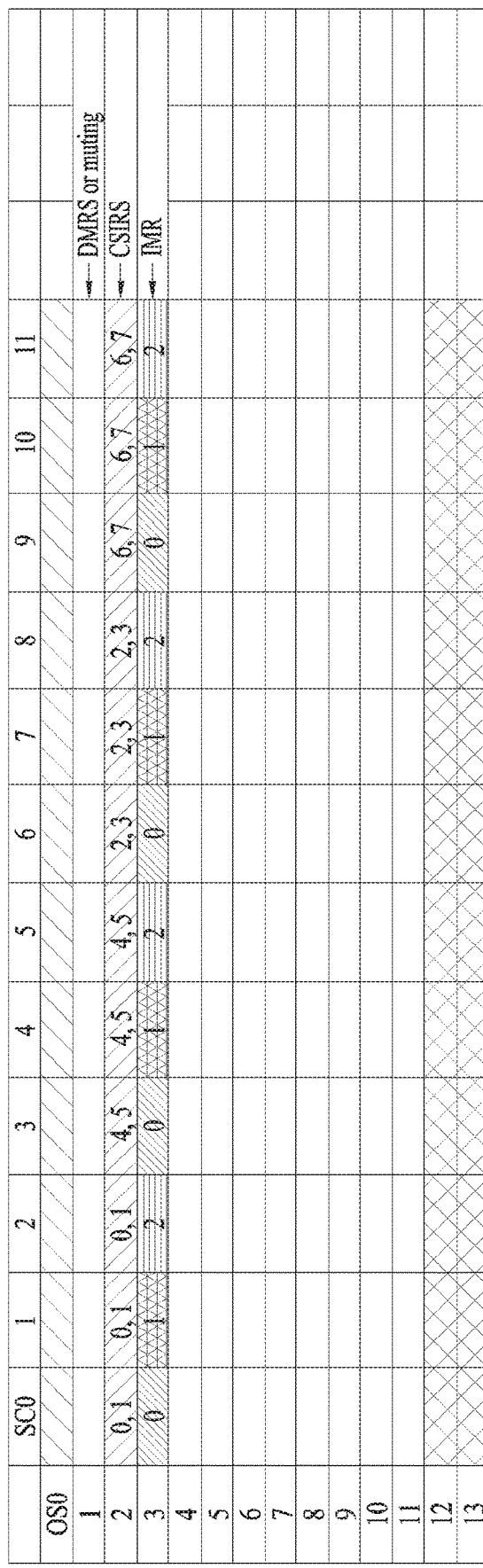
FIG. 22 shows another example of NewRAT CSI-RS and IMR configurations according to an embodiment of the present invention.

FIG. 22 shows another example of NewRAT CSI-RS and IMR configurations according to an embodiment of the present invention. Particularly, FIG. 22 shows an example that the aforementioned CSI-RS pattern 2 (8-port CSI-RS) and IMR pattern 1 are diagrammatized with reference to a single RB.

In case of a shortage of IMR, a similar pattern is repeated in another OS so as to be configured as IMR. Moreover, as CSI-RS and IMR are disposed in a fore OS, a UE can start CSI calculation more quickly (from a timing of OS 4). Eventually, the UE can make a CSI reporting quickly.

In FIG. 22, when UL or DL data is transmitted together with CSI-RS or IMR, a transmitting end does not transmit data on a resource configured as CSI-RS and a receiving end does not receive data on a resource configured as IMR and CSI-RS. (Namely, a rate matching is performed.)

In FIG. 22, when DL data is transmitted together with CSI-RS or IMR, DM-RS is assumed as transmitted in OS 1. CSI-RS and IMR are defined in OS 2 and OS 3, respectively. if DM-RS is defined in another OS, CSI-RS and IMR may be defined in OS 1 and OS 2, respectively.

Yet, in case that a corresponding RB is used for UL data transmission together with CSI-RS or IMR, it may cause several problems structurally. In FIG. 22, if UL data is transmitted, a base station may transmit a CSI-RS signal in OS 2, have a GP during 1 OFDM symbol, and then receive UL data from OS 4. Thus, the following problems are caused.

Problem 1: A start OS of UL data transmission varies into OS 2 or OS 4 depending on a presence or non-presence of CSI-RS and IMR, whereby a subframe structure is complicated.

Problem 2: If a UE of an adjacent TP transmits UL data from OS 4, it may cause a problem that interference caused by the UE is not measured from IMR located in OS 3.

Problem 3: As UL data is transmitted from OS 4, allocated resources for UL data transmissions are reduced in comparison with transmitting UL data from OS 2.

Problem 4: OS 1 is wasted despite not being used as GP.

The problem 2 can be solved by changing a location of IMR in FIG. 22 into another OS except an OS right next to a CSI-RS transmitted OS. Moreover, the problem 3 or the problem 4 can be solved by changing a location of CSI-RS in FIG. 22 into OS 1. The following description is made with reference to the drawings.

Figure 23:
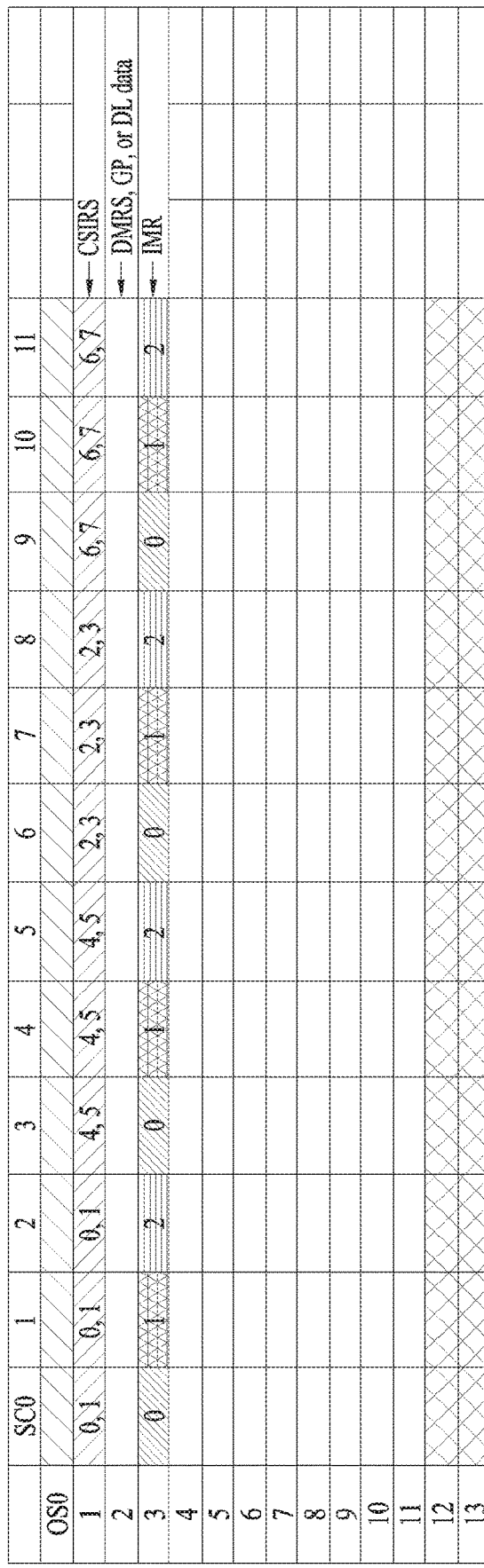
FIG. 23 and FIG. 24 show further examples of NewRAT CSI-RS and IMR configurations according to an embodiment of the present invention.
Figure 24:
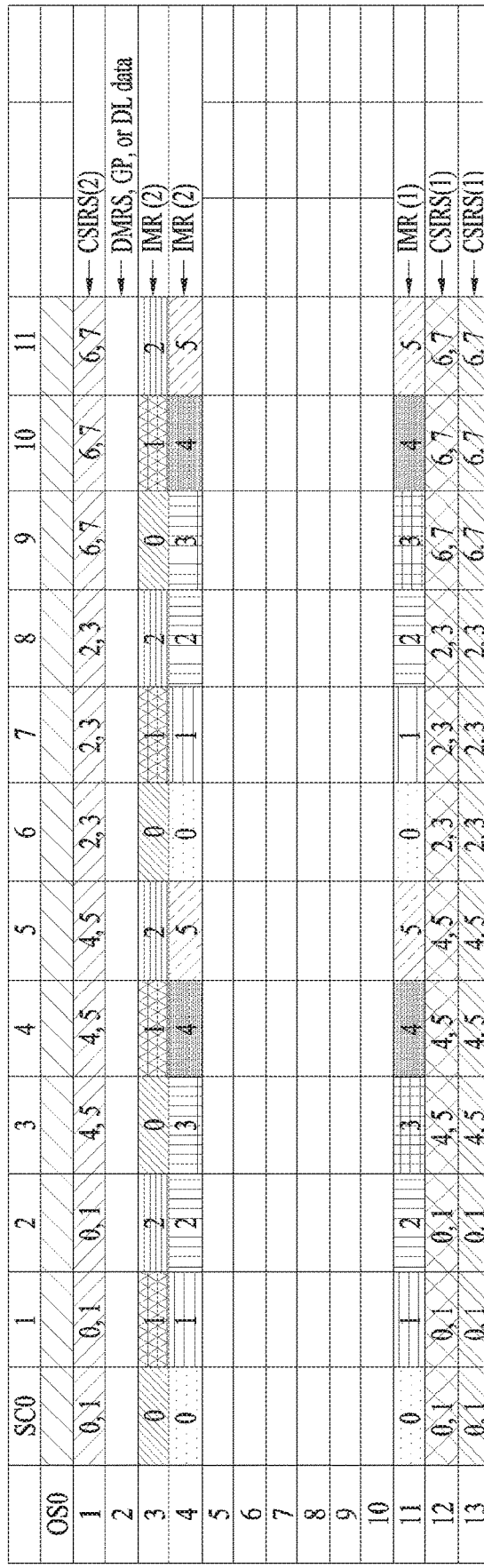

FIG. 23 and FIG. 24 show further examples of NewRAT CSI-RS and IMR configurations according to an embodiment of the present invention.

Particularly, FIG. 23 shows an embodiment of CSI-RS and IMR to solve the problems of FIG. 22. Particularly, CSI-RS is located at OS 1 and IMR is located at OS 3. In FIG. 23, when DL data is transmitted together with CSI-RS or IMR, a location of DM-RS may be configured at OS 2. When UL data is transmitted, OS 2 is configured as GP. Or, DM-RS may be configured in a random OS in which DL data is transmitted. And, DL data may be transmitted in OS 2.

FIG. 24 results from merging FIG. 21 and FIG. 23 together. Resources of CSI-RS (2) and IMR (2) may be configured for a UE having a low CSI calculation speed or a UE necessary to give CSI feedback quickly. OR, resources of CSI-RS (1) and IMR (1) may be configured for a UE different from the above-mentioned UEs. Preferably, computation power of a UE is reported in form of UE capability to a base station through RRC signaling, and the base station can configure CSI-RS and IMR suitable for computation power of UEs existing in a cell of its own.

A base station may determine which pattern will be applied among various CSI-RS patterns and IMR patterns proposed in the above description and then inform a UE of the determination. In doing so, the base station should inform the UE of a location of the CSI-RS resource and a location of the IMR to be used for CSI measurement together with a pattern by identifying CSI-RS resource and IMR, which should be rate-matched, using RRC signaling or DCI.

In some implementations, in LTE system, a base station informs each UE of locations of CSI-RS resource and IMR that should be measured, transmits CSI-RS periodically according to the corresponding information, and mutes the location of the IMR periodically. Yet, NewRAT considers configuring CSI-RS and IMR aperiodically as well as configuring them periodically. Namely, the base station aperiodically transmits CSI-RS (only if CSI feedback is necessary), mutes the aperiodically configured IMR, and requests (triggers) CSI feedback to the UE aperiodically.

For example, a base station makes a request for CSI feedback to a UE through a DL control channel in subframe #n. In doing so, location information of CSI-RS and IMR supposed to be measured by the UE should be included in the DL control channel additionally. Namely, subframe location and resource configuration information the UE should measure for each of the CSI-RS and the IMR is delivered through DCI (i.e., DL control channel) as well as the CSI feedback triggering message. In this case, the subframe location may be signaled with reference to a DCI received subframe.

For example, in case of receiving DCI in subframe #n, a UE receives m1 and m2 from a base station and then discovers a subframe index n−m1 of a CSI-RS resource and a subframe index n−m2 of IMR. (Of course, assuming that m1 and m2 always have the same value, only one value may be defined.) The UE discovers RE locations of CSI-RS and IMR in the corresponding subframes through resource configuration information signaled by the base station.

Additionally, a subframe index n+m3, in which UCI will be transmitted, and resource allocation information may be delivered through DCI. Here, in the resource allocation information, information indicating whether to be transmitted on PUSCH or PUCCH may be included as well. In case of a shortage of PUCCH resource in subframe #(n+m3), the base station may command the UE to transmit UCIO on PUSCH. Or, in case of performing PDSCH transmission in subframe #(n+m3), the base station may command the UE to transmit UCI through PUCCH resources of OS 12 and OS 13.

Figure 25:
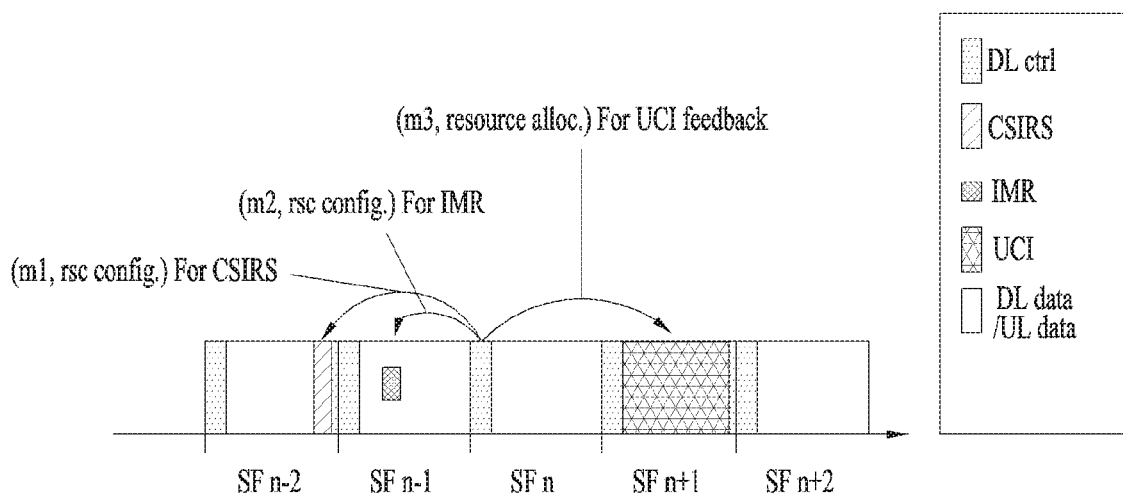
FIG. 25 shows an example of triggering aperiodic CSI feedback according to an embodiment of the present invention.

FIG. 25 shows an example of triggering aperiodic CSI feedback according to an embodiment of the present invention.

Referring to FIG. 25, it can be observed that m1, m2, m3, IMR configuration information, CSI-RS resource configuration information and UCI resource allocation information are delivered through DCI. Particularly, in FIG. 25, m1, m2 and m3 are set to 2, 1 and 1, respectively.

To reduce DCI overhead, IMR configuration information and CSI-RS resource configuration information may be delivered in advance through RRC signaling instead of DCI.

UCI resource allocation information may be delivered through DCI by being limited to PUSCH/PUCCH CSI feedback selection information. Sub-resource allocation information on each of a case of PUSCH CSI feedback and a case of PUCCH CSI feedback may be delivered in advance through RRC signaling.

Figure 26:
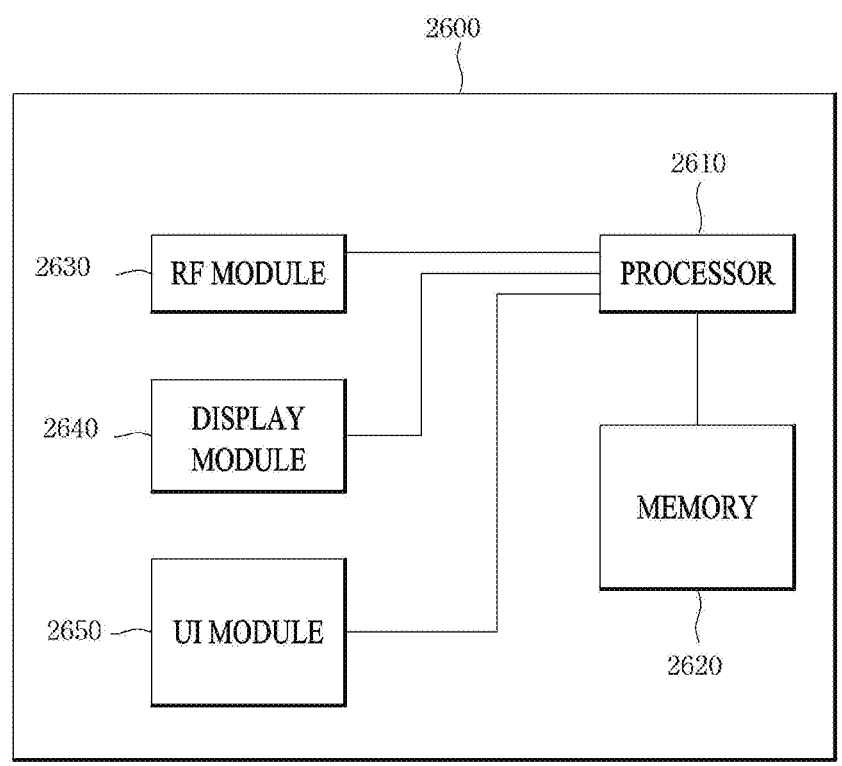
FIG. 26 is a block diagram of a communication apparatus according to one embodiment of the present invention.

FIG. 26 is a block diagram of a communication apparatus according to one embodiment of the present invention.

Referring to FIG. 26, a communication apparatus 2600 includes a processor 2610, a memory 2620, an RF module 2630, a display module 2640 and a user interface module 2650.

The communication apparatus 2600 is shown for convenience of description and some modules thereof may be omitted. In addition, the communication apparatus 2600 may further include necessary modules. In addition, some modules of the communication apparatus 2600 may be subdivided. The processor 2610 is configured to perform an operation of the embodiment of the present invention described with respect to the drawings. For a detailed description of the operation of the processor 2610, reference may be made to the description associated with FIGS. 1 to 25.

The memory 2620 is connected to the processor 2610 so as to store an operating system, an application, program code, data and the like. The RF module 2630 is connected to the processor 2610 so as to perform a function for converting a baseband signal into a radio signal or converting a radio signal into a baseband signal. The RF module 2630 performs analog conversion, amplification, filtering and frequency up-conversion or inverse processes thereof. The display module 2640 is connected to the processor 2610 so as to display a variety of information. As the display module 2640, although not limited thereto, a well-known device such as a Liquid Crystal Display (LCD), a Light Emitting Diode (LED), or an Organic Light Emitting Diode (OLED) may be used. The user interface module 2650 is connected to the processor 2610 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Therefore, the detailed description should not be interpreted restrictively in all aspects but considered as exemplary. Thus, it is intended that the present invention cover the modifications and variations of this invention provided they come within the scope of the appended claims and their equivalents.

INDUSTRIAL APPLICABILITY

Although the aforementioned method of transmitting/receiving a reference signal in a next generation communication system and apparatus therefor are described by focusing on examples applying to the 3GPP LTE system, they are applicable to various wireless communication systems as well as to the 3GPP LTE system.

What is claimed is:

1. A method of transmitting channel state information to a network by a user equipment including a wireless transceiver and a processor connected to the wireless transceiver in a wireless communication system, the method comprising:
receiving information on at least two sets configured with a channel measurement resource and an interference measurement resource from the network;
receiving information on a specific channel measurement resource and a specific interference measurement resource from the network;
determining the channel state information using the specific channel measurement resource and the specific interference measurement resource; and
transmitting the computed channel state information to the network,
wherein the information on the specific channel measurement resource and the specific interference measurement resource indicates one of the at least two sets, and
wherein the at least two sets comprise a first set configured with a channel measurement resource located at last two symbols and an interference measurement resource located at a symbol right before the last two symbols in a resource grid defined with a plurality of symbols and a plurality of subcarriers and a second set configured with a channel measurement resource located at a second symbol in the resource grid and an interference measurement resource located at a fourth symbol in the resource grid.

2. The method of claim 1, further comprising reporting capability of the user equipment to the network, wherein the specific channel measurement resource and the specific interference measurement resource are determined based on the reported capability of the user equipment.

3. The method of claim 1, wherein a downlink control signal is located at a first symbol in the resource grid and wherein one of a downlink demodulation reference signal, a downlink data signal and a guard period for changing into an uplink transmission mode is located at a third symbol in the resource grid.

4. The method of claim 1, wherein a sequence assigned to the specific channel measurement resource is spread by having an orthogonal cover code of length 3 applied thereto.

5. The method of claim 1, wherein an independent beamforming in symbol unit is applied to the specific channel measurement resource.

6. A user equipment in a wireless communication system, the user equipment comprising:
a wireless transceiver; and
a processor connected to the wireless transceiver, the processor configured to:
receive information on at least two sets configured with a channel measurement resource and an interference measurement resource from a network,
receive information on a specific channel measurement resource and a specific interference measurement resource from the network,
determine channel state information using a specific channel measurement resource and a specific interference measurement resource received from the network, and
transmit the computed channel state information to the network,
wherein the information on the specific channel measurement resource and the specific interference measurement resource indicates one of the at least two sets, and
wherein the at least two sets comprise a first set configured with a channel measurement resource located at last two symbols and an interference measurement resource located at a symbol right before the last two symbols in a resource grid defined with a plurality of symbols and a plurality of subcarriers and a second set configured with a channel measurement resource located at a second symbol in the resource grid and an interference measurement resource located at a fourth symbol in the resource grid.

7. The user equipment of claim 6, wherein the processor reports capability of the user equipment to the network and wherein the specific channel measurement resource and the specific interference measurement resource are determined based on the reported capability of the user equipment.

8. The user equipment of claim 6, wherein a downlink control signal is located at a first symbol in the resource grid and wherein one of a downlink demodulation reference signal, a downlink data signal and a guard period for changing into an uplink transmission mode is located at a third symbol in the resource grid.

9. The user equipment of claim 6, wherein a sequence assigned to the specific channel measurement resource is spread by having an orthogonal cover code of length 3 applied thereto.

10. The user equipment of claim 6, wherein an independent beamforming in symbol unit is applied to the specific channel measurement resource.

* * * * *